(12) United States Patent
Ren et al.

(10) Patent No.: US 10,397,339 B2
(45) Date of Patent: Aug. 27, 2019

(54) SERVER-SIDE PLUGIN CHECKER FOR TOLL-FREE DATA SERVICE

(71) Applicant: Verizon Patent and Licensing Inc., Arlington, VA (US)

(72) Inventors: Dahai Ren, Lincoln, MA (US); Shuai Wu, Wellesley, MA (US); Susan Kelly, Maynard, MA (US); Hector Saint-Hilaire, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 226 days.

(21) Appl. No.: 14/852,884

(22) Filed: Sep. 14, 2015

(65) Prior Publication Data

US 2017/0078404 A1    Mar. 16, 2017

(51) Int. Cl.
*G06F 15/16*     (2006.01)
*H04L 29/08*     (2006.01)

(52) U.S. Cl.
CPC ............ *H04L 67/146* (2013.01); *H04L 67/20* (2013.01); *H04L 67/34* (2013.01)

(58) Field of Classification Search
CPC ........ H04L 67/146; H04L 67/34; H04L 67/20

USPC .......................................................... 709/219
See application file for complete search history.

(56) References Cited

U.S. PATENT DOCUMENTS

| | | | | |
|---|---|---|---|---|
| 8,326,315 B2* | 12/2012 | Phillips | .............. | G08B 21/0236 455/456.1 |
| 8,665,785 B2* | 3/2014 | Beck | ...................... | G06Q 30/02 370/328 |
| 8,693,358 B2* | 4/2014 | Hodges | .................. | G06Q 30/00 370/252 |
| 8,812,613 B2* | 8/2014 | Keith, Jr. | ............ | H04L 67/1095 709/203 |
| 9,413,769 B2* | 8/2016 | Zhang | .................... | G06Q 20/40 |

* cited by examiner

*Primary Examiner* — Umar Cheema
*Assistant Examiner* — Anh Nguyen

(57) ABSTRACT

A system may receive a content identifier corresponding to content to be accessed via a toll free data service (toll-free data service). The system may determine, based on the content identifier, whether a content provider device, associated with the content, is configured with a serving component associated with serving the content via the toll-free data service. The system may provide an indication of whether the content provider device is configured with the serving component. The content may be accessible via the toll-free data service when the content provider device is configured with the serving component.

20 Claims, 6 Drawing Sheets

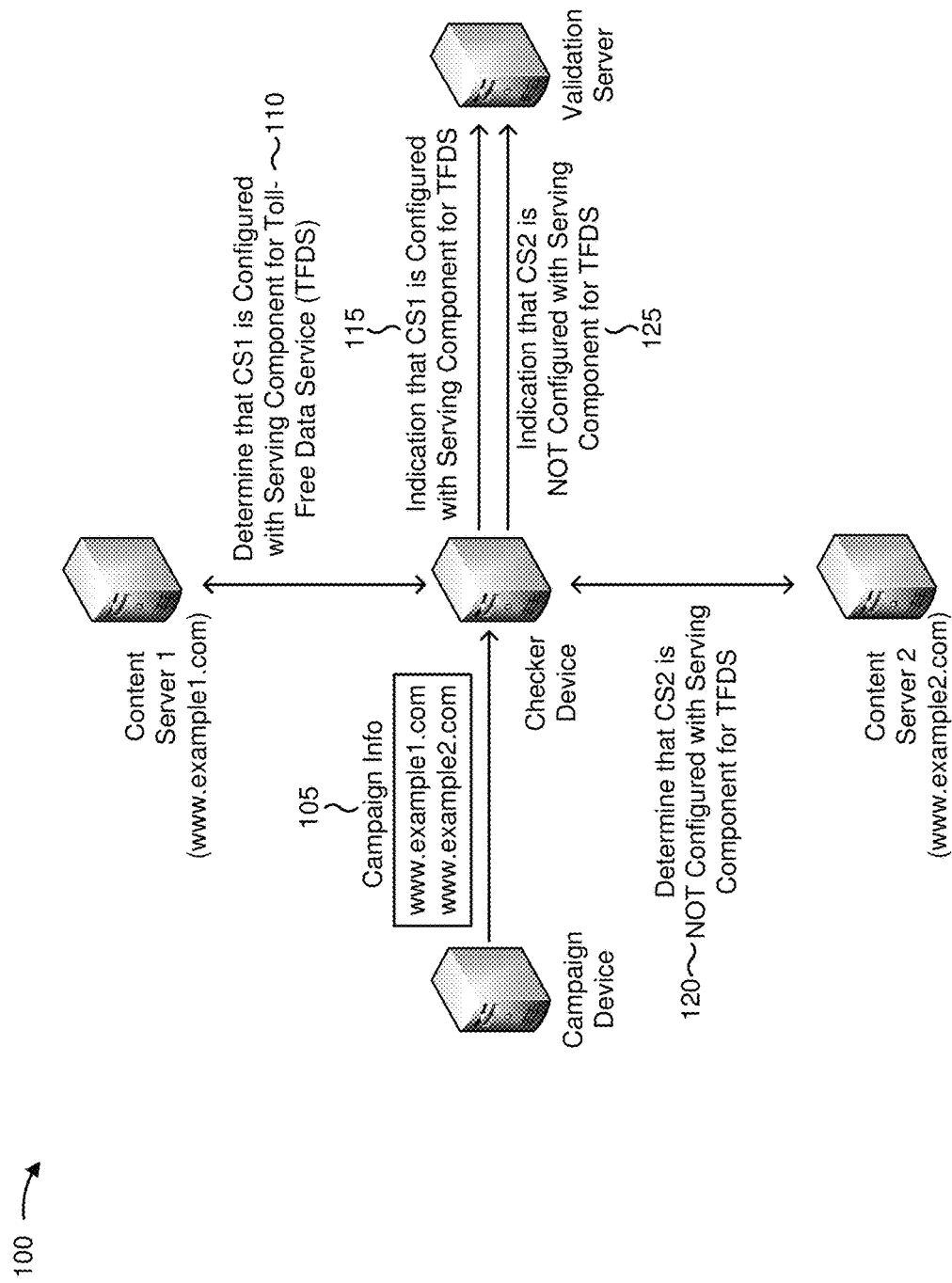

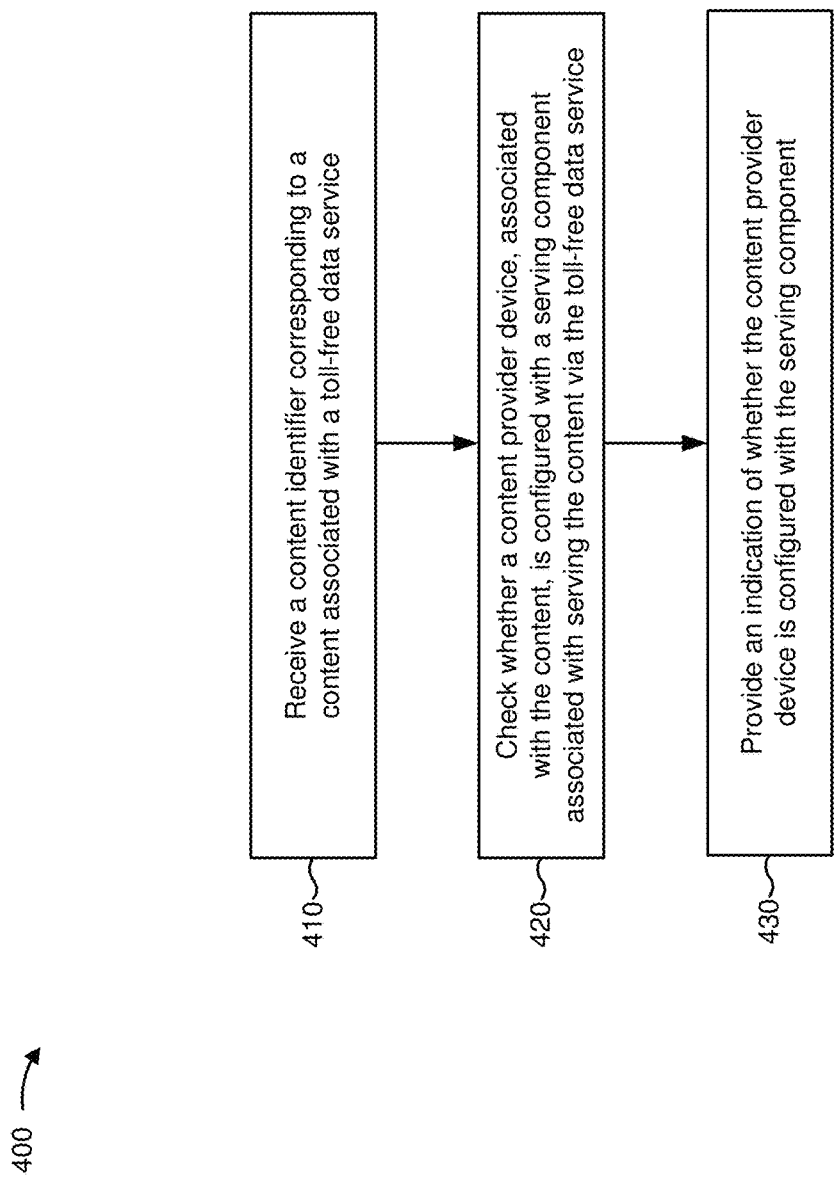

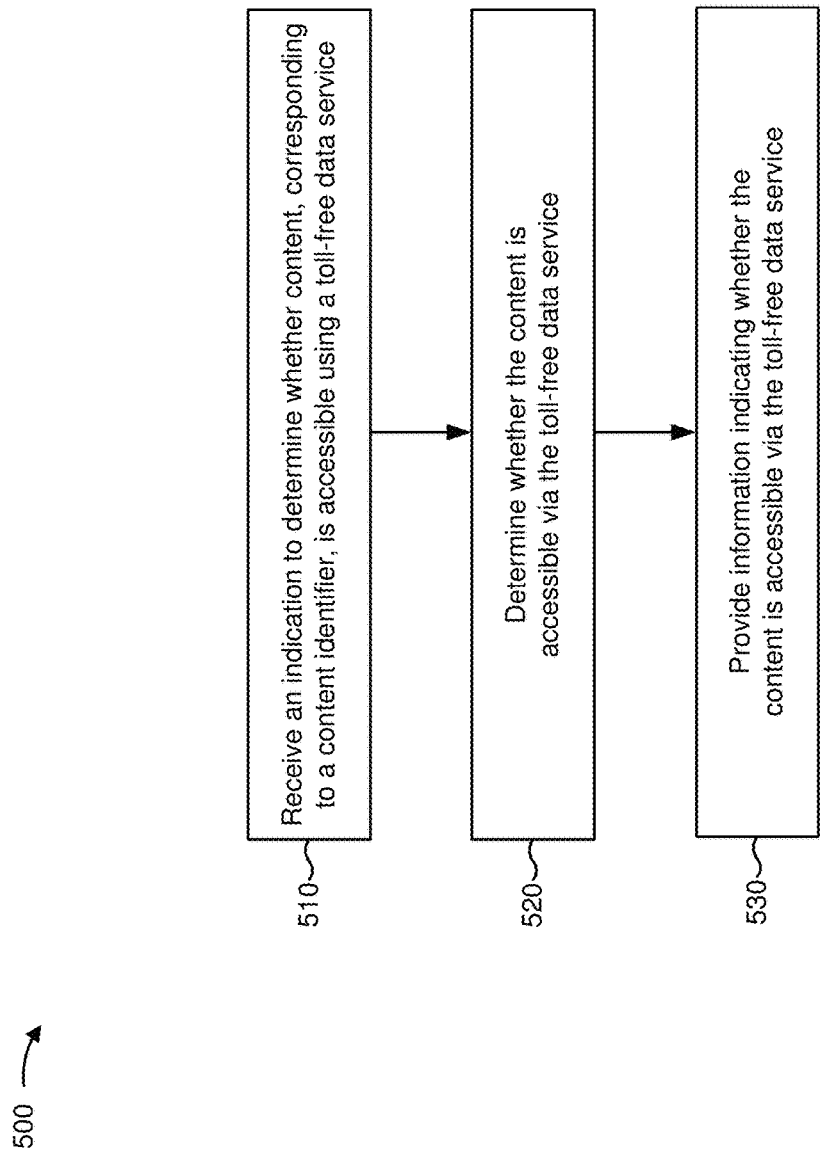

SERVER-SIDE PLUGIN CHECKER FOR TOLL-FREE DATA SERVICE

BACKGROUND

Content providers, such as online media companies, may wish to deliver content (e.g., a document, a webpage, a movie, an audio file, or the like) to network users using a resource identifier. Network users may pay a network data usage fee to access the content. Some content providers may choose to subsidize the cost of network data usage, associated with the content, which would otherwise be paid by the network users accessing the content.

BRIEF DESCRIPTION OF THE DRAWINGS

FIGS. 1A and 1B are diagrams of an overview of an example implementation described herein;

FIG. 4 is a flow chart of an example process for checking whether a content provider device is configured with a serving component associated with serving content via a toll-free data service; and FIG. 5 is a flow chart of an example process for determining whether content is accessible using a toll-free data service.

DETAILED DESCRIPTION OF PREFERRED EMBODIMENTS

Figure 1B:
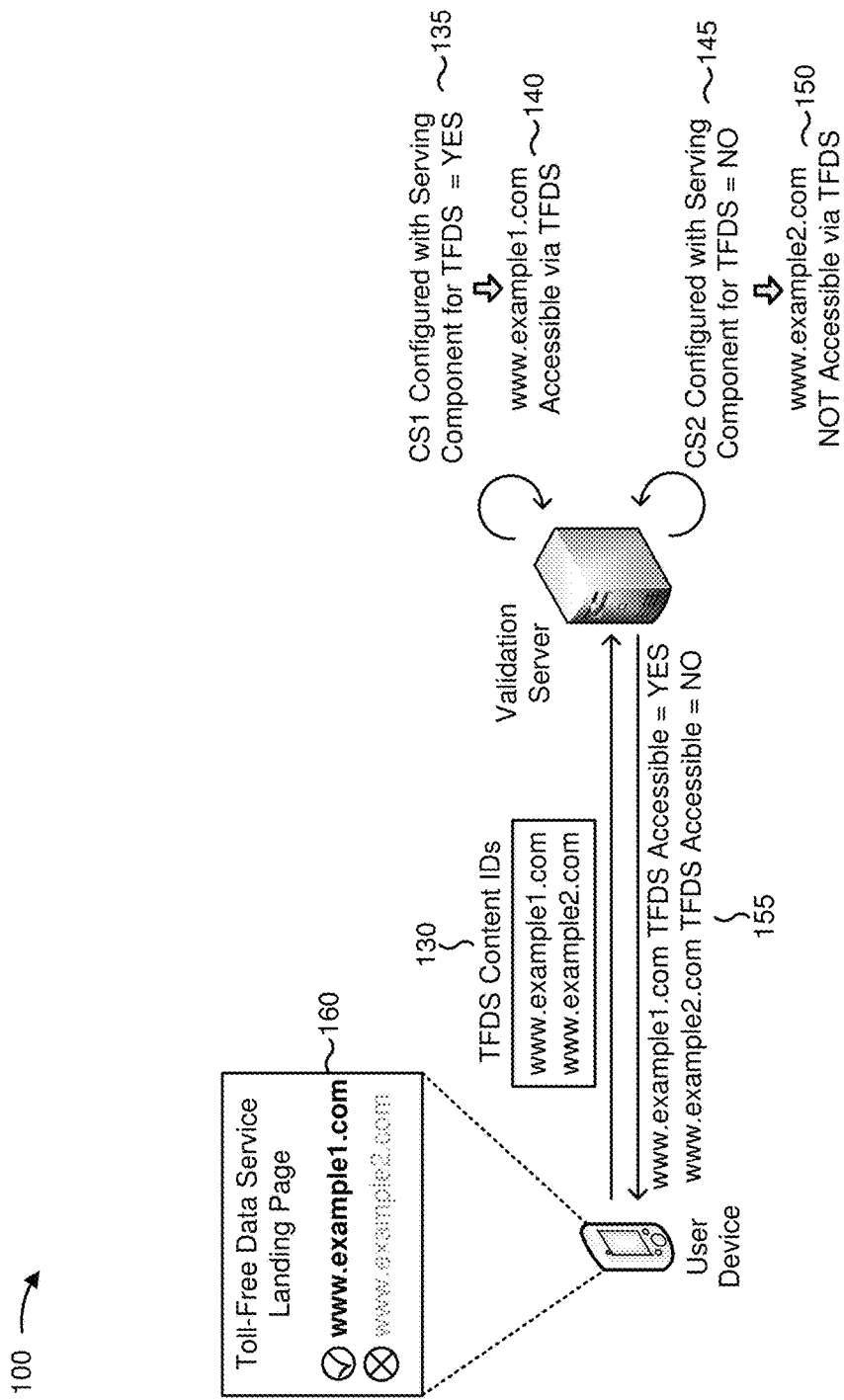

The following detailed description of example implementations refers to the accompanying drawings. The same reference numbers in different drawings may identify the same or similar elements.

An entity, such as a company, a business, an organization, or the like, may enter into an agreement with a service provider that allows for content, associated with the entity, to be accessible via a toll-free data service. For example, the entity may enter into an agreement with the service provider that allows for content, such as an advertisement, a company website, video content, audio content, or the like, to be accessible via the toll-free data service. As such, a content provider device may need to be configured with a component (herein referred to as a serving component) that enables the content to be accessed via the toll-free data service. In some implementations, the serving component may enable serving of the content via the toll-free data service and/or may enable billing of the entity for data usage associated with the accessing the content via the toll-free data service. For example, in some implementations, the serving component may include a Server-Side Plugin (SSP) component.

The SSP component may include a serving component configured on a content provider device that is to serve content via the toll-free data service (herein sometimes referred to as "sponsored content"). In some implementations, the SSP component may be configured to inspect traffic associated with the content provider device, such as hypertext transfer protocol (HTTP) traffic, HTTP Secure (HTTPS) traffic, or the like, and establish session timing records for content accessed via the toll-free data service (e.g., such that the session timing records can be provided for billing purposes). Additionally, or alternatively, the SSP component may be configured to modify embedded object links (e.g., included in a web page) in order to identify sponsored content being served by the content provider device. In some implementations, if the SSP component is not configured on the content provider device, then a user device may be unable to access the sponsored content, the user device may have difficulty accessing the content (e.g., such that a user experience may be degraded), and/or the user may be charged for accessing the content. For example, if the content provider device is not configured with the SSP component, then a request from the user device to load an embedded object, associated with the sponsored content (e.g., an image, a video, etc.), may time out (i.e., because the SSP component is not configured on the content provider device, the content may not be served via the toll-free data service).

Implementations described herein may allow a checker device to determine whether a serving component, associated with serving content via a toll-free data service, is configured on a content provider device associated with the content. Based on the determination by the checker device, a user device may be provided with an indication whether the content is accessible via the toll-free data service, and act accordingly (e.g., by displaying information indicating whether the content is accessible via the toll-free data service, by preventing the user device from accessing the content when the content is not accessible via the toll-free data service, by allowing the user device to access the content when the content is accessible via the toll-free data service, etc.). In this way, a user experience, associated with the toll-free data service, may be improved. Moreover, an amount of resources (e.g., battery power, bandwidth, etc.), consumed in association with using the toll-free data service, may be reduced since, for example, the user device may not waste resources in a failed attempt to access the content.

Notably, while implementations described herein are described in the context of the serving component being the SSP component, in some implementations, the serving component may include another type of component associated with serving content via a toll-free data service.

FIGS. 1A and 1B are diagrams of an overview of an example implementation 100 described herein. For the purposes of example implementation 100, assume that a campaign device, associated with a service provider network, stores or has access to campaign information that includes information that identifies two items of content (i.e., first content and second content with respective content identifiers: www.example1.com and www.example2.com), included in a campaign associated with an entity (e.g., an advertising campaign associated with a company), that is to be accessed via a toll-free data service. Further, assume that the first and second content, identified by the respective content identifiers, are hosted by first and second content provider devices (i.e., content server 1 and content server 2), respectively.

As shown in FIG. 1A, and by reference number 105, the campaign device may provide the campaign information to a checker device (e.g., when the advertising campaign is deployed, updated, etc.). In some implementations, the checker device may include a device configured to determine whether the content provider devices are configured with a serving component associated with serving the content via the toll-free data service. As shown, the campaign information may include a first content identifier (e.g., www.example1.com), associated with first content (e.g., a first web page), and a second content identifier (e.g., www.example2.com) associated with second content (e.g., a second web page).

As shown by reference number 110, based on receiving the first content identifier, the checker device may communicate with a first content provider device (e.g., content server 1 that hosts the first content) to check whether the first content provider device is configured with the serving component associated with serving the content via the toll-free data service. As shown, the checker device may determine that the first content provider device is configured with the serving component. As shown by reference number 115, the checker device may provide, to a validation server (e.g., a device associated with determining whether content is accessible via the toll-free data service), an indication that the first content provider device is configured with the serving component. The validation server may store information indicating that the first content provider device is configured with the serving component.

Similarly, as shown by reference number 120, based on receiving the second content identifier, the checker device may communicate with a second content provider device (e.g., content server 2 that hosts the second content) to check whether the second content provider device is configured with the serving component associated with serving the content via the toll-free data service. As shown, the checker device may determine that the second content provider device is not configured with the serving component. As shown by reference number 125, the checker device may provide, to the validation server, an indication that the second content provider device is not configured with the serving component. The validation server may store information indicating that the second content provider device is not configured with the serving component.

For the purposes of FIG. 1B, assume that a user device has received, from a user of the user device, an instruction to access a toll-free data service landing page (e.g., a web page, associated with the service provider of the toll-free data service, designed to provide information indicating whether content is accessible via the toll-free data service). For example, the user may wish to view a list of items of content that may be accessed toll-free (e.g., such that the list would not include content that is not toll-free).

Further, assume that the user device has received information associated with the toll-free data service landing page that includes the first content identifier and the second content identifier (e.g., indicating that the first content and the second content may be accessible via the toll-free data service).

As shown by reference number 130, the user device may provide the first content identifier and the second content identifier to the validation server. As shown by reference number 135, the validation server may receive the first content identifier, and may determine (e.g., based on the information received from the checker device) that the first content provider device is configured with the serving component. As shown by reference number 140, based on determining that the first content provider device is configured with the serving component, the validation server may determine that the first content is accessible via the toll-free data service.

Similarly, as shown by reference number 145, the validation server may receive the second content identifier, and may determine (e.g., based on the information received from the checker device) that the second content provider device is not configured with the serving component. As shown by reference number 150, based on determining that the second content provider device is not configured with the serving component, the validation server may determine that the second content is not accessible via the toll-free data service.

As shown by reference number 155, the validation server may provide, to the user device, an indication that the first content is not accessible via the toll-free data service and an indication that the second content is accessible via the toll-free data service. The user device may receive the indications associated with the first and second content.

As shown by reference number 160, the user device may provide, for display, information indicating that the first content is accessible via the toll-free data service by, for example, displaying a check mark next to the first content identifier on the toll-free data service landing page, by displaying the first content identifier in bold text on the toll-free data service landing page, or the like. As further shown, the user device may provide, for display, information indicating that the second content is not accessible via the toll-free data service by, for example, displaying an "X" next to the second first content identifier on the toll-free data service landing page, by displaying the second content identifier in grayed-out text on the toll-free data service landing page (e.g., such that a user cannot select the second content identifier), or the like.

Here, a user experience may be improved (e.g., since the user device may prevent a failed attempt to access the second content, since the user device may not access content that the user believes is toll-free when, in fact, the content may not be accessed toll-free, etc.). Further, an amount of resources (e.g., battery power, bandwidth, etc.), consumed in association with using the toll-free data service, may be reduced (e.g., since the user device may not waste communication resources, processing resources, battery power, or the like, in a failed attempt to access the second content).

As indicated above, FIGS. 1A and 1B are provided merely as examples. Other examples are possible and may differ from what was described with regard to FIGS. 1A and 1B.

In this way, a checker device may determine whether a serving component, associated with serving content via a toll-free data service, is configured on a content provider device responsible for serving the content. Based on the determination by the checker device, a user device may be provided with an indication whether the content is accessible via the toll-free data service, and act accordingly (e.g., by displaying information indicating whether the content is accessible via the toll-free data service, by preventing the user device from accessing the content when the content is not accessible via the toll-free data service, by allowing the user device to access the content when the content is accessible via the toll-free data service, etc.).

Figure 2:
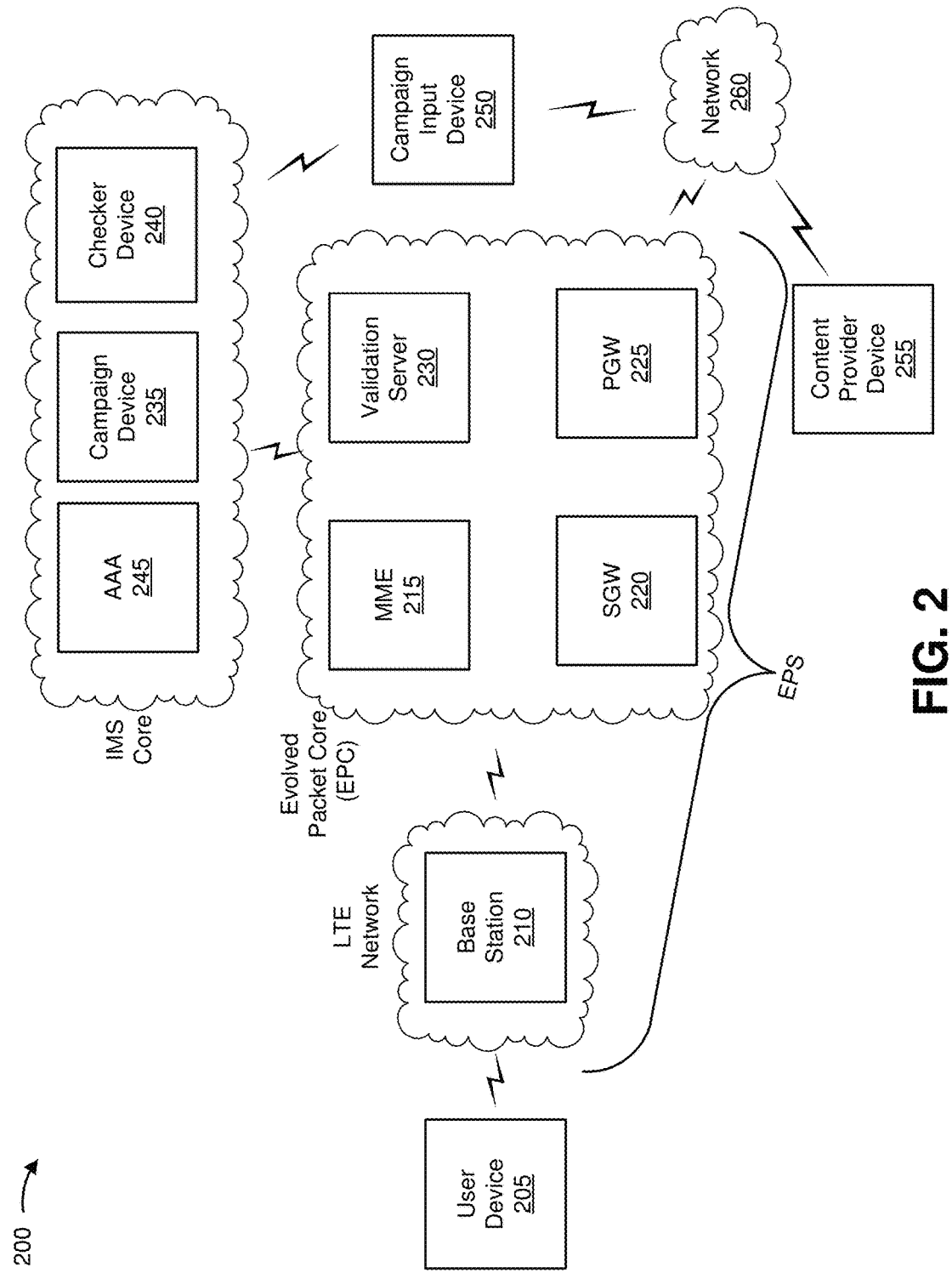
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a validation server 230, a campaign device 235, a checker device 240, an authentication, authorization, and accounting server (AAA) 245, a campaign input device 250, a content provider device 255, and/or a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 communicate with the EPC. The EPC may include MME 215, SGW 220, PGW 225, and/or validation server 230 that enable user devices 205 to communicate with network 260 and/or an Internet protocol (IP) multimedia subsystem (IMS) core. The IMS core may include campaign device 235, checker device 240, and/or AAA 245, and may manage device registration and authentication, session initiation, registration information, etc., associated with user devices 205 and/or content provider devices 255. Campaign device 235, checker device 240, and/or AAA 245 may reside in the EPC and/or the IMS core.

User device 205 may include one or more devices capable of communicating with base station 210 and/or a network (e.g., network 260). For example, user device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. User device 205 may send traffic to and/or receive traffic from network 260 (e.g., via base station 210, SGW 220, and/or PGW 225).

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 260 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225) and/or other network devices associated with the EPC and/or the IMS core. SGW 220 may also receive traffic from network 260 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 260. Additionally, or alternatively, PGW 225 may receive traffic from network 260, and may send the traffic to user device 205 via SGW 220 and base station 210. PGW 225 may record data usage information (e.g., byte usage), and may provide the data usage information to AAA 245.

Validation server 230 may include one or more devices capable of receiving, determining, storing, processing, and/or providing information associated with whether content is accessible via the toll-free data service. For example, validation server 230 may include a server device, a group of server devices, a gateway, a router, a modem, a switch, a firewall, a NIC, a hub, a bridge, a server, an OADM, or a similar device. In some implementations, validation server 230 may receive campaign rules from campaign device 235, may apply the campaign rules to traffic received from PGW 225, and may instruct PGW 225 how to handle the traffic based on the campaign rules. Additionally, or alternatively, validation server 230 may instruct AAA 245 how to charge for data usage associated with the traffic. Different campaign enforcement devices 230 may be associated with different geographic regions and/or cellular service areas, in some implementations.

Campaign device 235 may include one or more devices capable of receiving, generating, storing, processing, and/or providing information associated with a toll-free data service campaign (e.g., registration information, campaign rules, etc.). For example, campaign device 235 may include a server device or a similar device. Campaign device 235 may generate campaign rules, and may deploy the campaign rules, for enforcement, to one or more campaign enforcement devices 230 (e.g., associated with one or more cellular service areas). In some implementations, campaign device 235 may receive, from campaign input device 250, information associated with registering a resource identifier and may verify whether the resource identifier complies with validation rules.

Checker device 240 may include one or more devices capable of receiving, determining, storing, processing, and/or providing information associated with whether content provider device 255 is configured with the serving component associated with serving the content via the TFDS. For example, checker device 240 may include a server device or a group of server devices. In some implementations, checker device 240 may be included in a cloud computing environment associated with a service provider of user device 205. In some implementations, checker device 240 and validation server 230 may be implemented in a same device or a same collection of devices.

AAA 245 may include one or more devices, such as one or more server devices, that perform authentication, authorization, and/or accounting operations for communication sessions associated with user device 205. For example, AAA 245 may store data usage information for user device 205, for a user associated with user device 205, for content provider device 255, for a content provider (e.g., that provides a toll-free data service), etc.

Campaign input device 250 may include one or more devices capable of receiving, generating, storing, processing, and/or providing information associated with a toll-free data service campaign. For example, campaign input device 250 may include a desktop computer, a laptop computer, a mobile phone, a server device, or a similar device. Campaign input device 250 may receive input, from a content provider, that identifies registration information, and may provide the registration information to campaign management device 245.

Content provider device 255 may include one or more devices capable of providing content (e.g., to user device 205). For example, content provider device 255 may include a server device (e.g., a host server, a web server, an application server, etc.) or a similar device. Content provider device 255 may be associated with a content provider that provides a toll-free data service, where the content provider is charged for data usage rather than an end user associated with user device 205. In some implementations, content provider device 25 may be configured with a serving component associated with serving content to be accessed via a toll-free data service, such as SSP.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
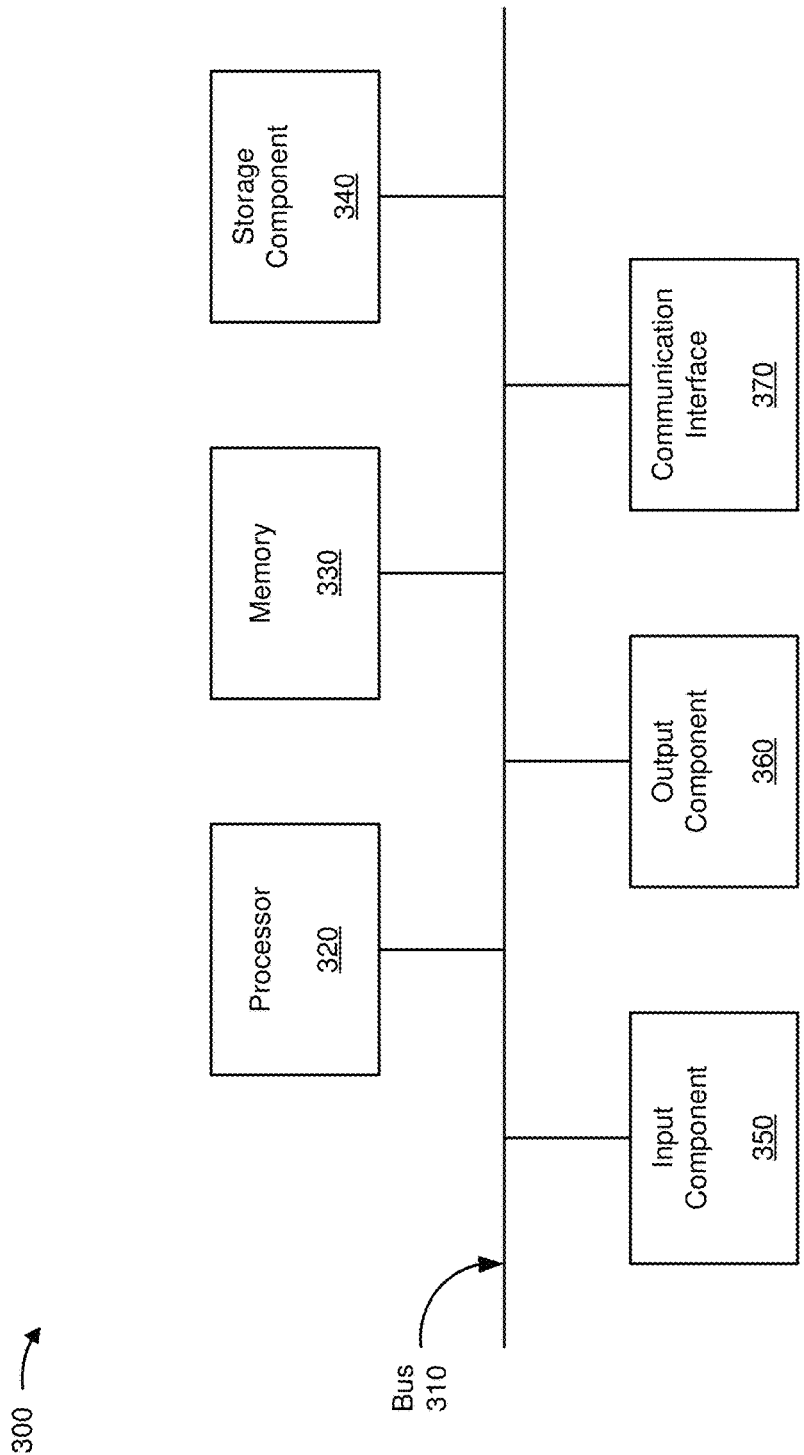
FIG. 3 is a diagram of example components of one or more devices of FIG. 2.

FIG. 3 is a diagram of example components of a device 300. Device 300 may correspond to user device 205, base station 210, MME 215, SGW 220, PGW 225, validation server 230, campaign device 235, checker device 240, AAA 245, campaign input device 255, and/or content provider device 255. In some implementations, user device 205, base station 210, MME 215, SGW 220, PGW 225, validation server 230, campaign device 235, checker device 240, AAA 245, campaign input device 255, and/or content provider device 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for checking whether a content provider device is configured with a serving component associated with serving content via a toll-free data service. In some implementations, one or more process blocks of FIG. 4 may be performed by checker device 240. In some implementations, one or more process blocks of FIG. 4 may be performed by another device or a group of devices separate from or including checker device 240, such as another device or group of devices of environment 200.

As shown in FIG. 4, process 400 may include receiving a content identifier corresponding to content associated with a toll free data service (block 410). For example, checker device 240 may receive a content identifier corresponding to content associated with a toll-free data service. In some implementations, checker device 240 may receive the content identifier after checker device 240 provides, to another device, a request for the content identifier. Additionally, or alternatively, checker device 240 may receive the content identifier when another device provides the content identifier, such as campaign device 235.

The content associated with the toll-free data service may include content that is to be accessible via the toll-free data service (herein sometimes referred to as "sponsored content"). For example, the content may include a web page, an image file, a video file, an audio file, or the like, that is sponsored for access via the toll-free data service (e.g., such that user device 205 may access the content without the data access counting against a data plan of user device 205). In some implementations, the content may be included in a campaign associated with an entity that sponsors the content. For example, a company may create a campaign that includes one or more web pages, image files, video files, audio files, or the like, that the company wishes to be accessible via the toll-free data service. In some implementations, the content may be hosted by content provider device 255 such that content provider device 255 may serve the content to user device 205.

In some implementations, the content identifier may include information that identifies the sponsored content (e.g., associated with a campaign) that is to be accessible via the toll-free data service. For example, the content identifier may include a uniform resource identifier (URI), a uniform resource locator (URL), a web address, a file name, or the like, that identifies the sponsored content.

In some implementations, the content identifier may be included in campaign information, associated with the campaign, that is stored or accessible by campaign device 235. For example, campaign device 235 may store or have access to campaign information that includes one or more content identifiers corresponding to one or more items of content stored by one or more content provider devices 255. In some implementations, the content identifier may be used by user device 205 to access the content via the toll-free data service, as described below.

In some implementations, checker device 240 may receive the content identifier based on a request provided by checker device 240. For example, checker device 240 may be configured to provide, to campaign device 235, a request for campaign information that includes content identifiers associated with one or more campaigns. In some implementations, checker device 240 may be configured to automatically (e.g., without user intervention) provide the request. Additionally, or alternatively, checker device 240 may be configured to periodically provide the request, such as once every hour, once every day, once every week, or the like. In such a case, checker device 240 may receive the content identifier in response to the request.

Additionally, or alternatively, checker device 240 may receive the content identifier based on information provided by another device. For example, campaign device 235 may be configured to provide the content identifier when campaign device 235 receives the content identifier and/or receives the campaign information that includes the content identifier (e.g., such that campaign device 235 updates checker device 240 when campaign device 235 receives a content identifier), an example of which is shown by reference number 105 in FIG. 1A. In some implementations, campaign device 235 may (e.g., automatically) provide the content identifier to checker device 240 when campaign device 235 receives campaign information associated with a new campaign (e.g., when a new campaign is launched) and/or when an existing campaign is modified.

As further shown in FIG. 4, process 400 may include checking whether a content provider device, associated with the content, is configured with a serving component associated with serving the content via the toll free data service (block 420). For example, checker device 240 may check whether content provider device 255, associated with the content, is configured with the serving component associated with serving the content via the toll-free data service. In some implementations, checker device 240 may check whether content provider device 255 is configured with the serving component after checker device 240 receives the content identifier. Additionally, or alternatively, checker device 240 may check whether content provider device 255 is configured with the serving component when checker device 240 receives an indication that checker device 240 is to check whether content provider device 255 is configured with the serving component from another device, such as validation server 230.

As described above, the serving component may include a component associated with serving the content via the toll-free data service. In some implementations, the serving component may enable serving of the content via the toll-free data service and/or may enable billing of the entity for data usage associated with accessing the content via the toll-free data service. For example, as described above, the serving component may include the SSP component.

In some implementations, checker device 240 may determine whether content provider device 255 is configured with the serving component based on a request provided by checker device 240. For example, checker device 240 may identify, based on the content identifier (e.g., by performing a domain name system (DNS) lookup), content provider device 255 that stores the content. Here, checker device 240 may provide, to content provider device 255, a request for content provider device 255 to indicate whether content provider device 255 is configured with the SSP component. In some implementations, the request may be included in a header of a HTTP request generated by checker device 240.

Continuing with the above example, content provider device 255 may receive the request, and may generate a response indicating whether content provider device 255 is configured with the SSP component. For example, content provider device 255 may set a value in a header of the response to a first value (e.g., 1) when content provider device 255 is configured with the SSP component, or may set the value in the header to a second value (e.g., 0) when content provider device 255 is not configured with the SSP component. Content provider device 255 may then provide the response to checker device 240. Here, checker device 240 may determine whether content provider device 255 is configured with the SSP component based on the response to the request. An example of checker device 240 checking whether content provider device 255 is configured with the serving component is shown by reference numbers 110 and 115 of FIG. 1B.

In some implementations, content provider device 255 may determine whether content provider device 255 is configured with the SSP component based on detecting the request provided by checker device 240. For example, in some implementations, the SSP component may be configured to receive traffic provided to content provider device 255, and may detect the header included in the request by checker device 240. Here, since the SSP component may receive the request and may respond that content provider device 255 is configured with the SSP component. In a case where content provider device 255 is not configured with the SSP component, content provider device 255 not modify the header associated with the request (e.g., since content provider device 255 may not detect and/or may ignore the header included in the request), thus indicating in a response that content provider device 255 is not configured with the SSP component.

As further shown in FIG. 4, process 400 may include providing an indication of whether the content provider device is configured with the serving component (block 430). For example, checker device 240 may provide an indication of whether content provider device 255 is configured with the serving component. In some implementations, checker device 240 may provide the indication after checker device 240 checks whether content provider device 255 is configured with the serving component. Additionally, or alternatively, checker device 240 may provide the indication when checker device 240 receives information indicating that checker device 240 is to provide the indication from another device, such as validation server 230.

In some implementations, checker device 240 may provide the indication to validation server 230, an example of which is shown by reference numbers 120 and 125 of FIG. 1A. For example, checker device 240 may provide the indication to validation server 230 such that validation server 230 may, at a later time, determine whether the content, corresponding to the content identifier and hosted by content provider device 255, is accessible via the toll-free data service, as described below. In some implementations, the indication may include information that identifies content provider device 255 associated with the content, information indicating whether content provider device 255 is configured with the serving component, the content identifier associated with the content hosted by content provider device 255, campaign information associated with the content hosted by content provider device 255, or the like.

In some implementations, upon receiving the indication from checker device 240, validation server 230 may store information indicating whether content provider device 255 is configured with the serving component (e.g., such that validation server 230 may access the information indicating whether content provider device 255 is configured with the serving component at a later time) and/or other information included in the indication.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for determining whether content is accessible using a toll free data service. In some implementations, one or more process blocks of FIG. 5 may be performed by validation server 230. In some implementations, one or more process blocks of FIG. 5 may be performed by another device or a group of devices separate from or including validation server 230, such as another device or group of devices of environment 200.

As shown in FIG. 5, process 500 may include receiving an indication to determine whether content, corresponding to a content identifier, is accessible using a toll free data service (block 510). For example, validation server 230 may receive an indication to determine whether content, corresponding to a content identifier, is accessible using the toll-free data service. In some implementations, validation server 230 may receive the indication when another device provides the indication, such as user device 205, checker device 240, and/or campaign device 235.

In some implementations, the indication may include a request to determine whether the content, corresponding to content identifiers associated with a toll-free data service landing page, is accessible via that toll-free data service. The toll-free data service landing page may include a web page (e.g., associated with the service provider of the toll-free data service) designed to provide, for display to a user of user device 205, information indicating whether content is accessible via the toll-free data service.

In some implementations, validation server 230 may receive the indication from user device 205. For example, user device 205 may receive information associated with the toll-free data service landing page that includes one or more content identifiers that identify content that may be accessible via the toll-free data service (e.g., in response to a user indicating that user device 205 is to display the toll-free data service landing page). In this example, upon receiving the information associated with the toll-free data service landing page, user device 205 may provide, to validation server 230, the one or more content identifiers included in the information associated with the toll-free data service landing page, an example of which is shown by reference number 130 of FIG. 1B.

As further shown in FIG. 5, process 500 may include determining whether the content is accessible via the toll free data service (block 520). For example, validation server 230 may determine whether the content is accessible via the toll-free data service. In some implementations, validation server 230 may determine whether the content is accessible via the toll-free data service after validation server 230 receives the indication to determine whether the content is accessible via the toll-free data service. Additionally, or alternatively, validation server 230 may determine whether the content is accessible via the toll-free data service when validation server 230 receives an indication that validation server 230 is to determine whether the content is accessible via the toll-free data service (e.g., from another device, based on a configuration of validation server 230, etc.).

In some implementations, validation server 230 may determine whether the content is accessible via the toll-free data service based on the information, stored or accessible by validation server 230, indicating whether content provider device 255 that hosts the content is configured with the serving component. For example, as described above, checker device 240 may check whether content provider device 255 is configured with the SSP component, and may provide an indication of whether content provider device 255 is configured with the SSP component to validation server 230. Here, based on receiving the indication from checker device 240 (e.g., including information that identifies content provider device 255, the content identifier, the campaign information, etc.) validation server 230 may determine whether content provider device 255 is configured with the SSP component.

In this example, if validation server 230 determines that content provider device 255 is configured with the SSP component, then validation server 230 may determine that the content is accessible via the toll-free data service, an example of which is shown by reference numbers 135 and 140 of FIG. 1B. In some cases, validation server 230 may determine whether the content is accessible based on additional information, such as information indicating that a campaign, associated with the content, is active. In such a case, validation server 230 may determine that the content is accessible when content provider device 255 is configured with the SSP component and when the campaign is active.

Alternatively, in this example, if validation server 230 determines that content provider device 255 is not configured with the SSP component, then validation server 230 may determine that the content is not accessible via the toll-free data service, an example of which is shown by reference numbers 145 and 150 of FIG. 1B. In such a case, validation server 230 may determine that the content is not accessible via the toll-free data service even when the campaign, associated with the content, is active. In another case, validation server 230 may determine that the content is not accessible via the toll-free data service even when then content provider device 255 is configured with the SSP component, such as when the campaign, associated with the content, is not active.

In some implementations validation server 230 server may determine whether the content is accessible via the toll-free data service based on one or more other conditions, such as whether the toll-free data service is valid for a geo-location of user device 205, whether the toll-free data service is valid for a time period at which the request for the content is received, or the like.

As further shown in FIG. 5, process 500 may include providing information indicating whether the content is accessible via the toll free data service (block 530). For example, validation server 230 may provide information indicating whether the content is accessible via the toll-free data service. In some implementations, validation server 230 may provide the information indicating whether the content is accessible after validation server 230 determines whether the content is accessible via the toll-free data service. Additionally, or alternatively, validation server 230 may provide the information indicating whether the content is accessible via the toll-free data service when validation server 230 receives information indicating that validation server 230 is to provide the indication.

In some implementations, validation server 230 may provide the information indicating whether the content is accessible via the toll-free data service to user device 205. For example, validation server 230 may provide, to user device 205, the information indicating whether the content is accessible in response to a request associated with accessing the toll-free data service landing page. Here, the information indicating whether the content is accessible via the toll-free data service may include information indicating whether one or more items of content, associated with the toll-free data service landing page, is accessible via the toll-free data service, an example of which is shown by reference number 155 of FIG. 1B.

In some implementations, upon receiving the information indicating whether the content is accessible via the toll-free data service from validation server 230, user device 205 may provide, for display to a user, information indicating whether the content is accessible via the toll-free data service, as shown by reference number 160 of FIG. 1B. For example, user device 205 may receive, from validation server 230, an information indicating that the content is accessible via the toll-free data service, and may provide, for display, a visual indication that the content is accessible via the toll-free data service by, for example, displaying a check mark near the content identifier on the toll-free data service landing page, displaying the content identifier in green text on the toll-free data service landing page, displaying the content identifier in bold text on the toll-free data service landing page, or the like. Additionally, or alternatively, user device 205 may display information associated with the content (e.g., a hyperlink) when the content is accessible via the toll-free data service, while user device 205 may not display any information associated with content that is not accessible via the toll-free data service (e.g., such that the user may view information associated with accessible content only).

As another example, user device 205 may receive, from validation server 230, an information indicating that the content is not accessible via the toll-free data service, and may provide, for display, a visual indication that the content is not accessible via the toll-free data service by, for example, displaying an "X" near the content identifier on the toll-free data service landing page, displaying the content identifier in red text on the toll-free data service landing page, displaying the content identifier in grayed-out text on the toll-free data service landing page (e.g., such that the user may not select the content), or the like. Additionally, or alternatively, user device 205 may not display any information associated with the content when the content is not accessible via the toll-free data service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow a checker device to determine whether a serving component, associated with serving content via a toll-free data service, is configured on a content provider device associated with the content. Based on the determination by the checker device, a user device may be provided with an indication whether the content is accessible via the toll-free data service, and act accordingly (e.g., by displaying information indicating whether the content is accessible via the toll-free data service, by preventing the user device from accessing the content when the content is not accessible via the toll-free data service, by allowing the user device to access the content when the content is accessible via the toll-free data service, etc.).

In this way, resources (e.g., battery power, bandwidth, etc.) associated with the user device and/or a service provider network, may be used more efficiently since, for example, the user device may not consume resources in a failed attempt to access the content. Moreover, a user experience, associated with the toll-free data service, may be improved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   providing, by one or more devices, a request to determine whether content on a toll-free data service landing web page is accessible via a toll-free data service prior to accessing the content,
   the toll-free data service relating to content from a content provider to be accessible to a user device via the toll-free data service, and
   the one or more devices being configured to periodically provide the request;
   receiving, by the one or more devices, a content identifier corresponding to content to be accessed via the toll-free data service,
   the content identifier being received based upon providing the request to a campaign device;
   determining, by the one or more devices and based on the content identifier, whether a content provider device, associated with the content, is configured with a serving component associated with serving the content via the toll-free data service,
   the serving component including a component that enables serving of the content via the toll-free data service,
   the serving component including a Server-Side Plugin (SSP) component associated with the toll-free data service, and
   the SSP component being configured to modify embedded object links to identify sponsored content associated with the content provider;
   providing, by the one or more devices, and to a validation server, an indication of whether the content provider device is configured with the serving component,
   the validation server being configured to determine that the content is accessible with the SSP component,
   the validation server storing information indicating that the content provider device is configured with the serving component, and
   the content being accessible via the toll-free data service when the content provider device is configured with the serving component;
   determining, by the one or more devices, a geo-location associated with the request to determine whether the content is accessible via the toll-free data service;
   determining, by the one or more devices, and based on the geo-location associated with the request and the indication of whether the content provider is configured with the serving component, whether the content is accessible via the toll-free data service; and providing, based on the request, a visual indication of whether the content is accessible via the toll-free data service,
  the visual indication being provided to a user interface of the user device to indicate whether the toll-free data service is accessible or not.

2. The method of claim 1, where determining whether the content provider device is configured with the serving component comprises:
  providing, to the content provider device, a request associated with determining whether the content provider device is configured with the serving component; and
  determining whether the content provider device is configured with the serving component based on a response, to the request, received from the content provider device.

3. The method of claim 1, where the serving component is configured to enable establishment of session timing records associated with accessing the content via the toll-free data service.

4. The method of claim 1, where determining whether the content is accessible via the toll-free data service comprises:
  determining whether a campaign, associated with the content, is active; and
  determining whether the content is accessible via the toll-free data service based on whether the campaign is active and based on whether the content provider device is configured with serving component.

5. A system, comprising:
  one or more memories; and
  one or more devices, communicatively coupled to the one or more memories, to:
    receive a request to determine whether content on a toll-free data service landing web page is accessible via a toll-free data service prior to accessing the content,
      the toll-free data service relating to content from a content provider to be accessible to a user device via the toll-free data service, and
      the one or more devices being configured to periodically provide the request;
    receive a content identifier corresponding to the content to be accessed via the toll-free data service,
      the content identifier being received based upon providing the request to a campaign device;
    determine, based on the content identifier, whether a content provider device, associated with the content, is configured with a serving component associated with serving the content via the toll-free data service,
      the serving component including a component that facilitates billing of a sponsor of the toll-free data service for data usage associated with accessing the content via the toll-free data service,
      the serving component including a Server-Side Plugin component associated with the toll-free data service, and
        the Server-Side Plugin component configured to modify embedded object links to identify sponsored content associated with the content provider;
    provide to a validation server an indication of whether the content provider device is configured with the serving component,
      the validation server configured to determine that the content is accessible with the Server-Side Plugin component,
      the validation server storing information indicating that the content provider device is configured with the serving component, and
      the content being accessible via the toll-free data service when the content provider device is configured with the serving component;
    determine a geo-location associated with the request to determine whether the content is accessible via the toll-free data service;
    determine, based on the request, the geo-location associated with the request, and the indication of whether the content provider device is configured with the serving component, whether the content is accessible via the toll-free data service; and
    provide, based on the request, a visual indication of whether the content is accessible via the toll-free data service,
      the visual indication being provided to a user interface of the user device to indicate whether the toll-free data service is accessible or not.

6. The system of claim 5, where the one or more devices, when determining whether the content provider device is configured with the serving component, are to:
  provide, to the content provider device, a request associated with determining whether the content provider device is configured with the serving component; and
  determine whether the content provider device is configured with the serving component based on a response, to the request, received from the content provider device.

7. The system of claim 5, where the serving component is configured to enable establishment of session timing records associated with accessing the content via the toll-free data service.

8. A non-transitory computer-readable medium storing instructions, the instructions comprising:
  one or more instructions that, when executed by one or more processors, cause the one or more processors to:
    receive a request to determine whether content on a toll-free data service landing web page is accessible via a toll-free data service prior to accessing the content,
      the toll-free data service relating to content from a content provider to be accessible to a user device via the toll-free data service, and
      the request being periodically updated;
    receive a content identifier corresponding to content to be accessed via a toll free data service,
      the content identifier being received based upon providing the request to a campaign device;
    determine, based on the content identifier, whether a content provider device, associated with the content, is configured with a Server-Side Plugin (SSP) component that permits the content provider device to serve the content via the toll-free data service,
      the SSP component configured to modify embedded object links to identify sponsored content associated with the content provider;
    provide to a validation server an indication of whether the content provider device is configured with the SSP component,
      the validation server configured to determine that the content is accessible with the SSP component,
      the validation server storing information indicating that the content provider device is configured with the SSP component, and the content being accessible via the toll-free data service when the content provider device is configured with the SSP component;

determine a geo-location associated with the request to determine whether the content is accessible via the toll-free data service;

determine, based on the geo-location associated with the request and the indication of whether the content provider device is configured with the SSP component, whether the content is accessible via the toll-free data service; and provide, based on the request, a visual indication of whether the content is accessible via the toll-free data service, the visual indication being provided to a user interface of the user device to indicate whether the toll-free data service is accessible or not.

9. The non-transitory computer-readable medium of claim 8, where the one or more instructions, that cause the one or more processors to determine whether the content provider device is configured with the SSP component, cause the one or more processors to:

provide, to the content provider device, a request associated with determining whether the content provider device is configured with the SSP component; and determine whether the content provider device is configured with the SSP component based on a response, to the request, provided by the content provider device.

10. The non-transitory computer-readable medium of claim 8, where the SSP component is configured to enable establishment of session timing records associated with accessing the content via the toll-free data service.

11. The non-transitory computer-readable medium of claim 8, where the one or more instructions, that cause the one or more processors to determine whether the content is accessible via the toll-free data service, cause the one or more processors to:

determine a time associated with the request to determine whether the content is accessible via the toll-free data service; and determine whether the content is accessible via the toll-free data service based on the time and based on whether the content provider device is configured with SSP component.

12. The method of claim 1, where the visual indication includes displaying the content identifier in grayed-out text on the toll-free data service landing web page.

13. The system of claim 5, where the visual indication includes displaying the content identifier in grayed-out text on the toll-free data service landing web page.

14. The non-transitory computer-readable medium of claim 8, where the visual indication includes displaying the content identifier in grayed-out text on the toll-free data service landing web page.

15. The method of claim 1, where the campaign device stores campaign information associated with the content provider.

16. The system of claim 5, where the content identifier includes at least one of:
    a uniform resource identifier (URI),
    a uniform resource locator (URL),
    a web address, or
    a file name.

17. The non-transitory computer-readable medium of claim 8, where the content identifier includes at least one of:
    a uniform resource identifier (URI),
    a uniform resource locator (URL),
    a web address, or
    a file name.

18. The method of claim 1, where the serving component is configured to inspect hypertext transfer protocol (HTTP) traffic associated with the content provider device or HTTP Secure (HTTPS) traffic associated with the content provider device.

19. The system of claim 5, where the serving component is configured to inspect hypertext transfer protocol (HTTP) traffic associated with the content provider device or HTTP Secure (HTTPS) traffic associated with the content provider device.

20. The non-transitory computer-readable medium of claim 8, where the SSP component is configured to inspect hypertext transfer protocol (HTTP) traffic associated with the content provider device or HTTP Secure (HTTPS) traffic associated with the content provider device.

* * * * *